United States Patent
Ono

(10) Patent No.: US 10,913,259 B2
(45) Date of Patent: Feb. 9, 2021

(54) THREE-DIMENSIONAL SHAPING APPARATUS AND THREE-DIMENSIONAL SHAPING SYSTEM

(71) Applicant: RICOH COMPANY, LTD., Tokyo (JP)

(72) Inventor: Yasukazu Ono, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 736 days.

(21) Appl. No.: 15/345,638

(22) Filed: Nov. 8, 2016

(65) Prior Publication Data
US 2017/0144374 A1   May 25, 2017

(30) Foreign Application Priority Data

Nov. 20, 2015   (JP) ................................. 2015-227939
Mar. 28, 2016   (JP) ................................. 2016-064116

(51) Int. Cl.
| | |
|---|---|
| *B33Y 50/02* | (2015.01) |
| *B33Y 30/00* | (2015.01) |
| *B33Y 40/00* | (2020.01) |
| *B29C 64/165* | (2017.01) |
| *B29C 64/357* | (2017.01) |
| *B29C 64/35* | (2017.01) |
| *B29C 64/393* | (2017.01) |

(52) U.S. Cl.
CPC ............ *B33Y 50/02* (2014.12); *B29C 64/165* (2017.08); *B29C 64/35* (2017.08); *B29C 64/357* (2017.08); *B33Y 30/00* (2014.12); *B33Y 40/00* (2014.12)

(58) Field of Classification Search
CPC ..... B29C 64/165; B29C 64/35; B29C 64/357; B33Y 30/00; B33Y 40/00; B33Y 50/02
USPC ............................................... 425/166
See application file for complete search history.

(56) References Cited

U.S. PATENT DOCUMENTS

| | | | |
|---|---|---|---|
| 6,733,528 B2* | 5/2004 | Abe ................. | B29C 64/165 264/113 |
| 2002/0090410 A1 | 7/2002 | Tochimoto et al. | |

(Continued)

FOREIGN PATENT DOCUMENTS

| | | |
|---|---|---|
| JP | 08-281808 | 10/1996 |
| JP | 2002-205338 | 7/2002 |
| JP | 2003-231182 | 8/2003 |

(Continued)

OTHER PUBLICATIONS

U.S. Appl. No. 15/173,853, filed Jun. 6, 2016.
Japanese Office Action issued in Japanese Patent Application No. 2016-064116 dated Dec. 17, 2019.

*Primary Examiner* — Matthew J Daniels
*Assistant Examiner* — Yunju Kim
(74) *Attorney, Agent, or Firm* — Oblon, McClelland, Maier & Neustadt, LLP.

(57) ABSTRACT

A three-dimensional shaping apparatus includes: a shaping chamber configured to hold powder; a leveler configured to move from a first position to a second position in a first direction on a top surface of the powder held in the shaping chamber to flatten the top surface of the powder; an ejector configured to eject a shaping liquid to the flattened top surface of the powder held in the shaping chamber; and a suction mechanism including a suction inlet arranged close to the second position of the shaping chamber.

15 Claims, 11 Drawing Sheets

(56) References Cited

U.S. PATENT DOCUMENTS

2004/0084814 A1    5/2004  Boyd et al.
2015/0367417 A1*  12/2015  Buller .................. B23K 26/346
                                                419/53

FOREIGN PATENT DOCUMENTS

| JP | 2003-231183   | 8/2003  |
| JP | 2008-302701 A | 12/2008 |
| JP | 2014-104683   | 6/2014  |
| JP | 2015-066872   | 4/2015  |
| JP | 5751118       | 5/2015  |

* cited by examiner

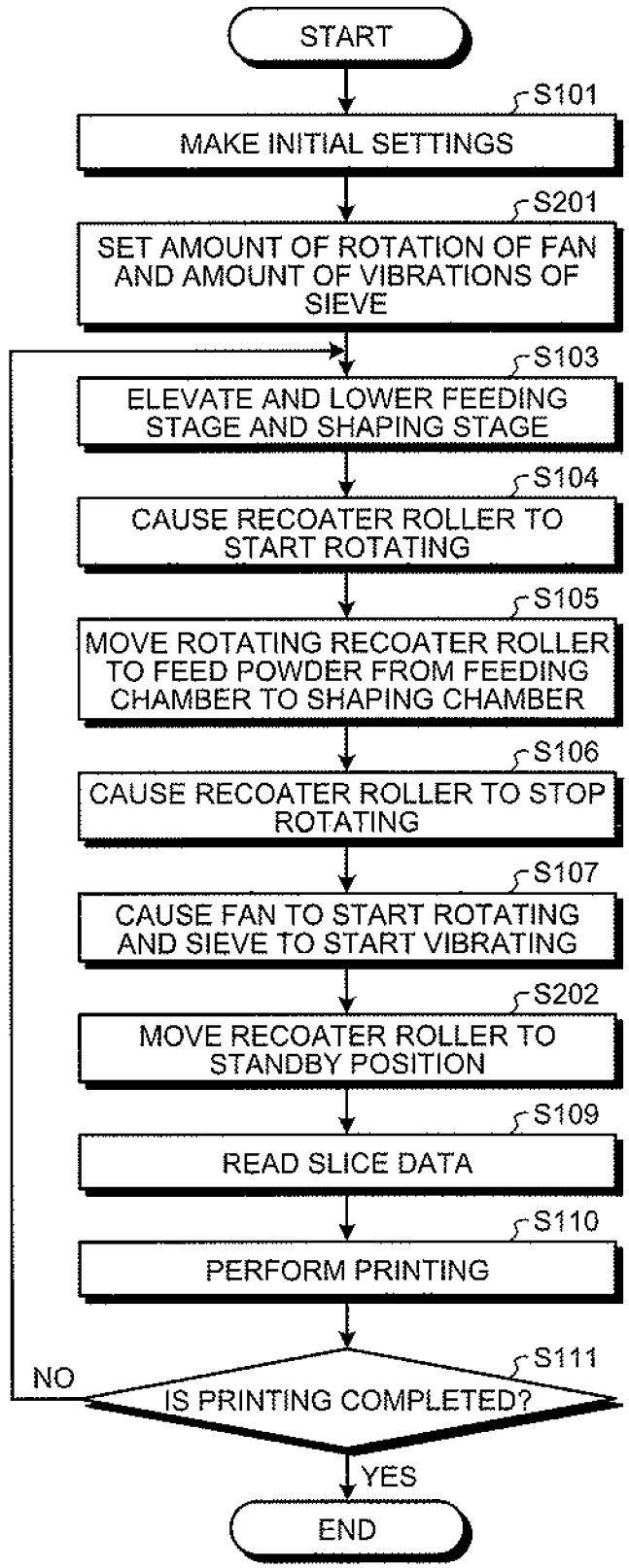

THREE-DIMENSIONAL SHAPING APPARATUS AND THREE-DIMENSIONAL SHAPING SYSTEM

CROSS-REFERENCE TO RELATED APPLICATIONS

The present application claims priority under 35 U.S.C. § 119 to Japanese Patent Application No. 2015-227939, filed Nov. 20, 2015 and Japanese Patent Application No. 2016-064116, filed Mar. 28, 2016. The contents of which are incorporated herein by reference in their entirety.

BACKGROUND OF THE INVENTION

1. Field of the Invention

The present invention relates generally to a three-dimensional shaping apparatus and a three-dimensional shaping system.

2. Description of the Related Art

It is known that some type of solid body shaping apparatuses (three-dimensional shaping apparatuses) shapes shaped solid bodies (three-dimensional shaped objects) using a lamination shaping method. With this technique, a 3D shaped object is shaped as follows. A flat layer (which is referred to as "powder layer") of metal powder or non-metal powder is formed on a shaping stage, for example. A shaping liquid (which may also be referred to as "binder liquid") is ejected to the powder layer to bind the powder to form a layered and shaped object (which is referred to as "shaped layer"). A series of processes of forming another powder layer on this shaped layer and forming another shaped layer is repeatedly performed, thereby shaping a 3D shaped object, in which the shaped layers are laminated.

In conventional three-dimensional shaping apparatuses, during feeding of powder from a feeding chamber to a powder chamber while spreading the powder evenly with a recoater roller, the powder can be suspended in air. The suspended powder can cling to a carriage or a print head and cause a trouble, such as defective ejection. Conventional three-dimensional shaping apparatuses have another problem that inside of the apparatus can be contaminated by dispersed powder.

SUMMARY OF THE INVENTION

A three-dimensional shaping apparatus includes a shaping chamber, a leveler, an ejector and a suction mechanism. The shaping chamber is configured to hold powder. The leveler is configured to move from a first position to a second position in a first direction on a top surface of the powder held in the shaping chamber to flatten the top surface of the powder. The ejector is configured to eject a shaping liquid to the flattened top surface of the powder held in the shaping chamber. The suction mechanism includes a suction inlet arranged close to the second position.

BRIEF DESCRIPTION OF THE DRAWINGS

FIG. 17 is a flowchart illustrating an overview of an example of operation in shaping by the three-dimensional shaping apparatus according to the third embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
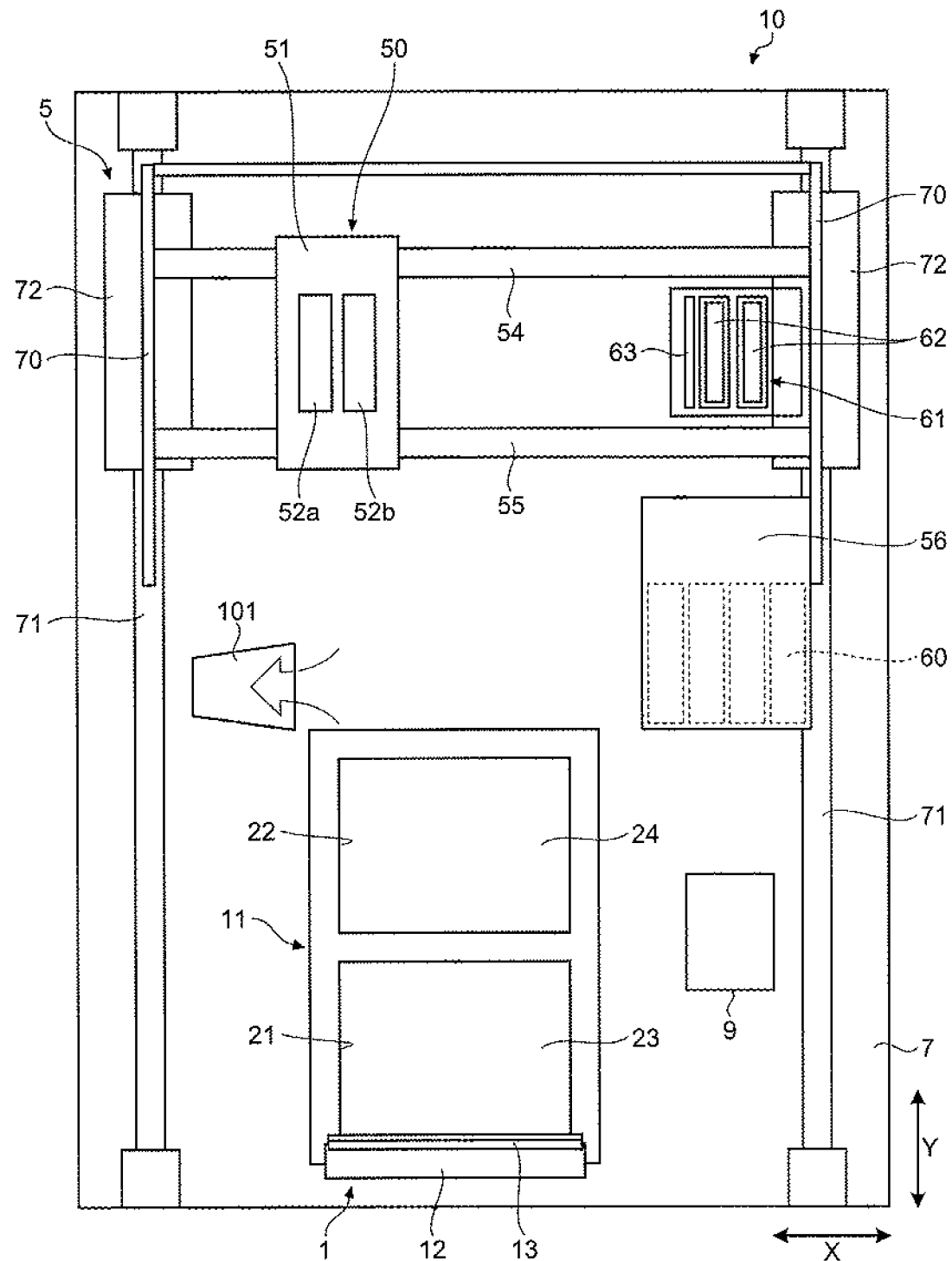
FIG. 1 is a top view schematically illustrating an example configuration of a three-dimensional shaping apparatus according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of the present invention are described in detail below with reference to the accompanying drawings. Each of three-dimensional shaping apparatuses described below is what is generally referred to as a 3D printer. The three-dimensional shaping apparatus makes a 3D shaped object using a powdered material. Generally, three-dimensional shaping apparatuses are categorized into several types according to shaping methods. Main types, into which three-dimensional shaping apparatuses are categorized, include laser sintering, powder lamination shaping, material jetting, photopolymerization, and sheet lamination. The description below is made through examples of three-dimensional shaping apparatuses belonging to the powder lamination shaping type. An three-dimensional shaping apparatus of this type repeats depositing a powdered material (hereinafter, "powder") in a thin layer and printing slice data, which is derived from 3D data, on the deposited layer in a layer-by-layer manner to shape a final 3D shaped object.

An embodiment has an object to provide a three-dimensional shaping apparatus and a three-dimensional shaping system capable of reducing defective ejection and contamination inside an apparatus resulting from dispersion of powder.

First Embodiment

Figure 2:
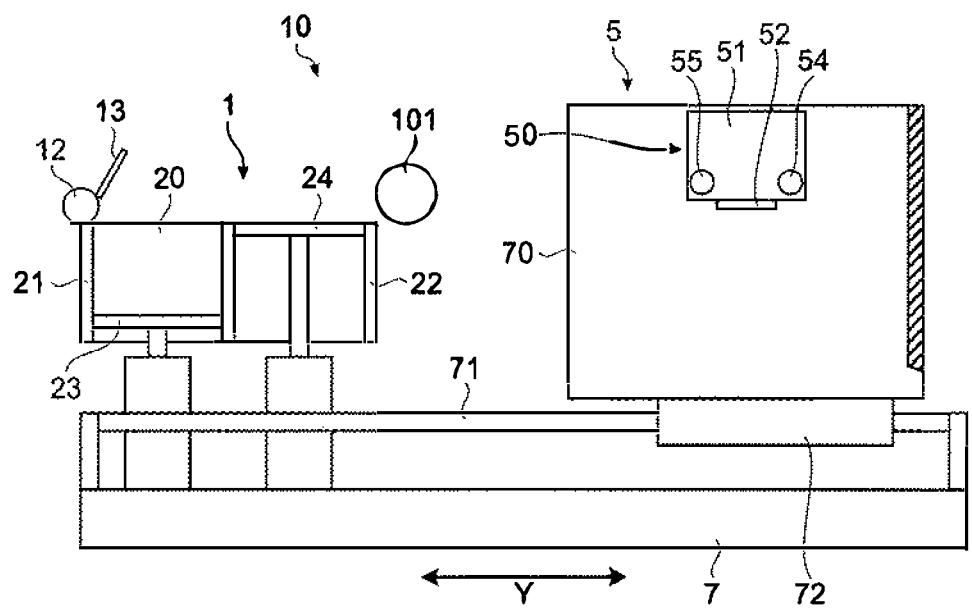
FIG. 2 is a side view schematically illustrating the example configuration of the three-dimensional shaping apparatus illustrated in FIG. 1.

FIG. 1 is a top view schematically illustrating an example configuration of a three-dimensional shaping apparatus according to a first embodiment. FIG. 2 is a side view schematically illustrating the example configuration of the three-dimensional shaping apparatus illustrated in FIG. 1.

As illustrated in FIG. 1 and FIG. 2, a three-dimensional shaping apparatus 10 is a powder lamination shaping apparatus and includes a shaping section 1 and a shaping unit (ejector) 5. In the shaping section 1, shaped layers, each of which is a layered and shaped object formed by binding powder (powdered material) 20, are to be formed. The shaping unit 5 ejects a shaping liquid to a powder layer, which is a layer of the powder 20 that is evenly spread, in the shaping section 1 to shape a 3D shaped object.

The shaping section 1 includes a powder chamber 11 and a recoater roller 12, which is a rotary member serving as a leveling member (recoater). As the leveling member, for example, a plate-like member (blade) can be used in place of the rotary member which may have a cylindrical shape.

The powder chamber 11 has a box shape and includes a feeding chamber 21, from which the powder 20 is to be fed, and a shaping chamber 22 where shaped layers are to be laminated to shape a 3D shaped object. The feeding chamber 21 and the shaping chamber 22 are arranged adjacent to each other and are open at their top faces. The size of the shaping chamber 22 will depend on the size of 3D shaped objects to be formed. For example, the shaping chamber 22 may have a size that allows shaping a 3D shaped object that is approximately A4 in size. As the powder 20, for example, metal powder with a particle size of 20 to 50 μm may be used.

The bottom of the feeding chamber 21 serves as a feeding stage 23 and is movable up and down in the vertical direction (height direction). Similarly, the bottom of the shaping chamber 22 serves as a shaping stage 24 and is movable up and down in the vertical direction (height direction). The feeding stage 23 has side surfaces arranged to be in contact with inner side surfaces of the feeding chamber 21. The shaping stage 24 has side surfaces arranged to be in contact with inner side surfaces of the shaping chamber 22.

Each of the feeding stage 23 and the shaping stage 24 is elevated and lowered by a corresponding motor (not illustrated) in the vertical direction (height direction). When moved as such, the top surface of each of the feeding stage 23 and the shaping stage 24 is maintained horizontal.

A powder supply device (not illustrated) is arranged above the feeding chamber 21. In initial operation of shaping or when the amount of powder in the feeding chamber 21 reduces, the powder 20 in a tank included in the powder supply device is supplied to the feeding chamber 21. Examples of a powder conveying method used to supply the powder include a screw conveyor method that utilizes a screw and a pneumatic transport method that utilizes air.

The recoater roller 12 feeds the powder 20 fed onto the feeding stage 23 of the feeding chamber 21 into the shaping chamber 22. Simultaneously therewith, the recoater roller 12 levels and flattens a top layer of the powder 20. As a result, a powder layer, which is a layer of a predetermined thickness of the powder 20, is formed in the shaping chamber 22.

The recoater roller 12 is a rod-like member longer than the internal dimension of the shaping chamber 22 and the feeding chamber 21 (i.e., the width of a portion, to which the powder 20 is fed, or a portion, in which the powder 20 is held). The recoater roller 12 is reciprocated by a reciprocation mechanism (not illustrated) in the direction indicated by arrow Y (the sub-scanning direction) (a first direction) along a stage surface (i.e., the surface where the powder 20 is to be placed) of the shaping stage 24. The recoater roller 12 thus transfers and feeds the powder 20 onto the shaping chamber 22.

The recoater roller 12 moves horizontally from outside the feeding chamber 21 in a manner to travel above the feeding chamber 21 and the shaping chamber 22 while being rotated by a rotation mechanism (not illustrated), such as a motor. The rotation mechanism causes the recoater roller 12 to rotate such that a portion of the recoater roller 12 contacting the powder 20 moves in the Y direction faster than a horizontal moving speed of the recoater roller 12 in the Y direction. Herewith, the top layer (i.e., a top surface of a powder layer 31) of the powder 20 transferred and fed onto the shaping chamber 22 is flattened. Accordingly, the recoater roller 12, the reciprocation mechanism, and the rotation mechanism make up a leveler that flattens the top surface of the powder 20 in the shaping chamber 22.

Furthermore, a powder removing plate 13, which is a powder removing member for removing the powder 20 clinging to the recoater roller 12, is arranged at the recoater roller 12. The powder removing plate 13 moves together with the recoater roller 12 while being in contact with the circumferential surface of the recoater roller 12.

The rotation speed and the moving speed of the recoater roller 12 in the recoating operation may preferably be set to their optimum values depending on a type of the powder 20, an environmental condition, and the like. Herewith, flatness of the top surface of the powder 20 fed to the shaping chamber 22 can be increased.

The shaping unit (ejector) 5 includes a liquid ejection unit 50 that ejects a shaping liquid to the powder layer on the shaping stage 24.

The liquid ejection unit 50 includes a carriage 51. One or more liquid ejection heads (hereinafter, simply referred to as "heads") are mounted on the carriage 51. The number of the heads to be mounted may preferably be determined depending on a print resolution and the like, for example. In the example illustrated in FIG. 1, two heads (52a and 52b) are mounted.

The carriage 51 is supported in a movable manner by guide members 54 and 55. The guide members 54 and 55 are supported in a manner movable up and down by side plates 70 at both sides of the guide members 54 and 55.

The carriage 51 is moved by a main-scanning move mechanism including a motor, a pulley, and a belt to reciprocate in the direction indicated by arrow X (see FIG. 1), which is the main-scanning direction. The moving speed of the carriage 51 may be changeable depending on a print mode or the like.

Each of the two heads (52a and 52b) (hereinafter, referred to as "the heads 52" when it is unnecessary to differentiate the two heads) includes two nozzle arrays, in each of which a plurality of nozzles for ejecting liquid are arranged. The two nozzle arrays of the head 52a which is one of the heads 52, eject a cyan shaping liquid and a magenta shaping liquid. The two nozzle arrays of the head 52b which is the other one, eject a yellow shaping liquid and a black shaping liquid, respectively. It should be noted that the configuration of the heads is not limited thereto.

A plurality of tanks 60, in which the cyan shaping liquid, the magenta shaping liquid, the yellow shaping liquid, and the black shaping liquid are respectively held, are attached to a tank holder 56. The shaping liquids are supplied to the heads 52a and 52b via supply tubes or the like.

A maintenance mechanism 61 that performs maintenance and recovery of the heads 52 of the liquid ejection unit 50 is arranged close to one side in the X direction.

The maintenance mechanism 61 includes, as its principal components, caps 62 and a wiper 63. With the caps 62 brought into close contact with nozzle surfaces (which is the surfaces of the head 52a/52b where the nozzles are formed) of the heads 52, the shaping liquids are sucked through the nozzles. This suction is for discharging the powder 20 clogged in the nozzles and shaping liquids having increased viscosity. Thereafter, the nozzle surface is wiped with the wiper 63 so that menisci (a negative pressure is developed inside the head 52) occur in the nozzles. The maintenance mechanism 61 caps the nozzle surface of the head 52a/52b with the cap 62 when the shaping liquid is not ejected, thereby preventing entry of the powder 20 into the nozzles and drying of the shaping liquids.

The shaping unit 5 includes a slider section 72 supported in a movable manner by guide members 71 arranged on a base member 7 such that the entire shaping unit 5 can reciprocate in the Y direction (the sub-scanning direction) orthogonal to the X direction. The entire shaping unit 5 is moved by a scanning mechanism (not illustrated) to reciprocate in the Y direction.

The liquid ejection unit 50 is placed in a manner movable, together with the guide members 54 and 55, up and down in the vertical direction (i.e., the direction orthogonal to the X direction and to the Y direction) and moved up and down by an elevating-and-lowering mechanism (not illustrated) in the vertical direction.

Elements of the three-dimensional shaping apparatus 10 including the shaping section 1 and the shaping unit 5 are controlled by a controller 9 illustrated in FIG. 1.

An overview of operations performed by the three-dimensional shaping apparatus 10 according to the first embodiment is described below. The three-dimensional shaping apparatus 10 operates as follows. First, as will be described later with reference to FIG. 4, the feeding stage 23 is elevated to cause the powder 20 in the feeding chamber 21 to protrude above a top opening of the feeding chamber 21 and, simultaneously, the shaping stage 24 is lowered to create a space of a predetermined depth above the shaping chamber 22. Thereafter, while causing the recoater roller 12 to rotate, the recoater roller 12, which is at a standby position (a first position) on the feeding chamber 21, is moved in the Y direction (the first direction) to a stop position (which is the position (a second position) where the recoater roller 12 is to be placed when a recoating operation is completed). As a result, powder 20a which protrudes above the top opening of the feeding chamber 21, is fed to the space above the shaping chamber 22. This operation is referred to as "recoating operation". Each of the thickness of the powder 20a protruding above the top opening of the feeding chamber 21, the depth of the space created above the shaping chamber 22, and the thickness of the powder layer 31 formed in this space may be, for example, approximately 100 μm.

Figure 3:
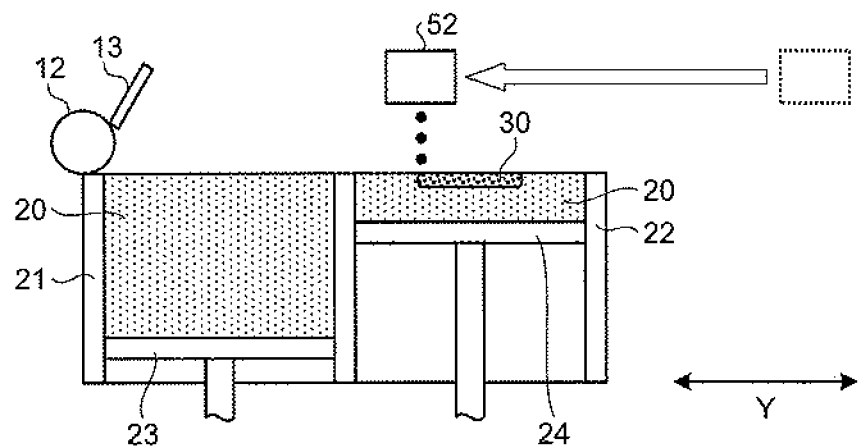
FIG. 3 is a view for describing a printing operation of the three-dimensional shaping apparatus.

Next, as illustrated in FIG. 3, the recoater roller 12 is returned to its standby position, and simultaneously the heads 52 are moved to above the shaping chamber 22. Thereafter, a first slice of a plurality of slice data which are derived from 3D data, is printed on the powder layer 31 that is newly deposited on the top layer in the shaping chamber 22, to form a shaped layer 30 of the corresponding layer.

Figure 4:
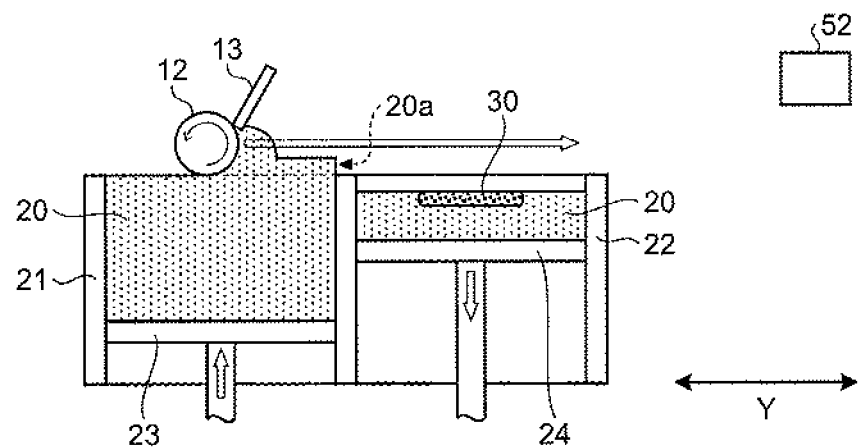
FIG. 4 is a view for describing a recoating operation of the three-dimensional shaping apparatus.

Next, as illustrated in FIG. 4, the feeding stage 23 is elevated to cause the powder 20 in the feeding chamber 21 to protrude above the top opening of the feeding chamber 21 and, simultaneously, the shaping stage 24 is lowered to create a space of the predetermined depth above the shaping chamber 22. Thereafter, an operation similar to the above-described recoating operation is performed to feed the powder 20a protruding above the top opening of the feeding chamber 21 to the space above the shaping chamber 22. The thickness, the depth, and the rotating direction of this operation may be the same as described above.

Next, as in the operation described above with reference to FIG. 3, the heads 52 are moved to above the shaping chamber 22, and the next slice data is printed on the powder layer 31 that is newly deposited on the top layer in the shaping chamber 22. Consequently, the next shaped layer 30 is formed on the previously-formed shaped layer 30.

The above-described operations are repeated until all the slice data are printed, to shape a 3D shaped object in the shaping chamber 22. The shaped 3D shaped object is taken out from the shaping chamber 22 and, after powder clinging to the 3D shaped object is removed, the 3D shaped object undergoes a drying process, whereby a finished 3D shaped object is obtained.

Figure 5:
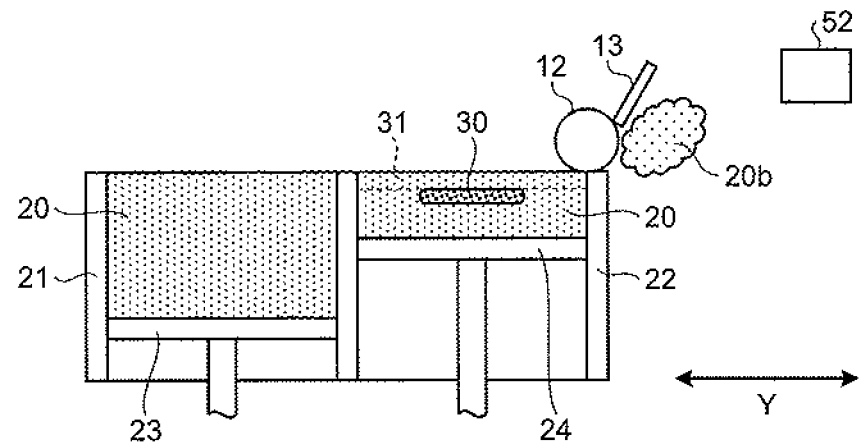
FIG. 5 is a view for describing powder that is suspended in air during the recoating operation.

When the powder 20 with a small particle size is transferred from the feeding chamber 21 to the shaping chamber 22 using the rotating recoater roller 12, the powder 20 can be suspended in air. For example, as illustrated in FIG. 5, when the recoater roller 12 moves to the stop position (the position of the recoater roller 12 at completion of the recoating operation) on the shaping chamber 22 and stops rotating, a cloud 20b of the powder 20 can be suspended in air in a traveling direction of the recoater roller 12. If a printing operation is performed in a condition where the powder 20 has been suspended in air in this manner, the powder 20 can cling to a head surface of the heads 52, which can lead to a problem, such as defective ejection and clogging and make printing difficult.

Then, in the first embodiment, as illustrated in FIG. 1 and FIG. 2, a suction inlet 101 is arranged close to the stop position where the recoater roller 12 is to be placed at completion of the recoating operation and the suspended powder 20 is sucked into the suction inlet 101 and removed. Occurrence of a problem, such as defective ejection and clogging, is reduced in this manner.

Figure 6:
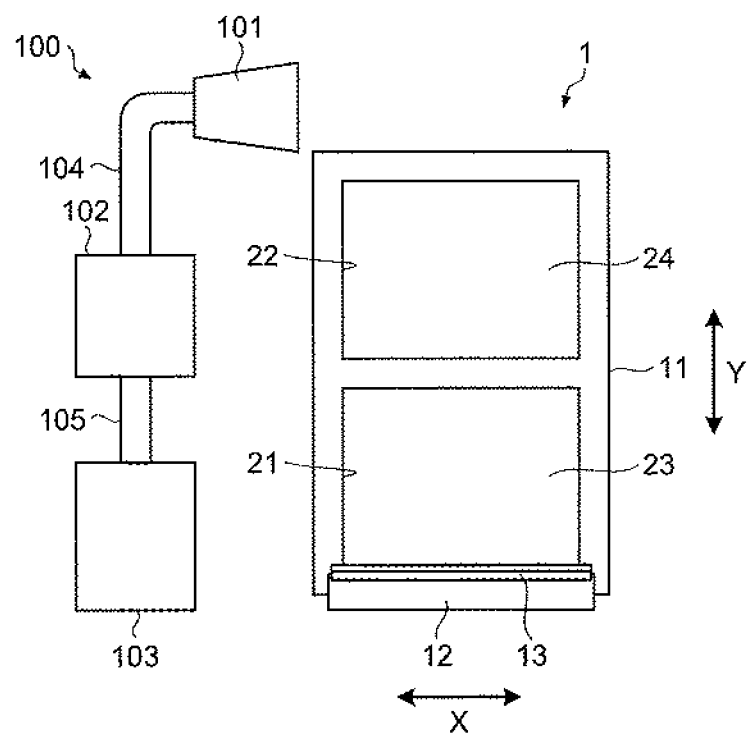
FIG. 6 is a top view illustrating an example schematic configuration of a portion of the three-dimensional shaping apparatus according to the first embodiment.

FIG. 6 illustrates a configuration of the shaping section 1 and a suction mechanism 100 in the three-dimensional shaping apparatus 10 according to the first embodiment. As illustrated in FIG. 6, the suction mechanism 100 has a configuration, in which the suction inlet 101 is connected to a suction pump 102 via a pipe 104, and the suction pump 102 is connected to a powder tank 103 via a pipe 105. The suction mechanism 100 is controlled by the controller 9 illustrated in FIG. 1.

The suction inlet 101 is arranged close to the stop position where the recoater roller 12 is to be placed at completion of the recoating operation. When the carriage 51 does not eject the shaping liquid(s) to the powder layer 31 in the shaping chamber 22 (i.e., when the printing operation is not performed), the carriage 51 is at a position (a third position) that is closer to a side of the shaping chamber 22, the side being close to the stop position of the recoater roller 12, and closer to one side of the shaping chamber 22. In the first embodiment, the suction inlet 101 is arranged at a position (a fourth position) closer to the opposite side of the shaping chamber 22 to the standby position (the third position) of the carriage 51.

The suction inlet 101 does not necessarily have a circular opening, and the opening can have any one of various shapes including oval shapes, polygonal shapes, such as triangular shapes and quadrangular (e.g., square, rectangle, rhombus, and trapezoid) shapes, and combinations of one or more arcs and one or more straight lines. The size of the opening may be designed appropriately depending on the size of the powder 20 diffused in the form of a cloud. The shape and the size of the opening of the suction inlet 101 are desirably set to a shape and a size, at which an air stream effective for a range where the powder 20 is diffused to form the cloud 20b can be generated. To generate such an air stream effective for the range where the powder 20 is diffused in the form of a cloud, an opening serving as the suction inlet 101 may be provided in a certain portion of a hood, a casing, or the like surrounding the shaping section 1. The certain portion may be opposite to the suction inlet 101 across the powder chamber 11; for example, the certain portion may be near the standby position of the heads 52.

Figure 7:
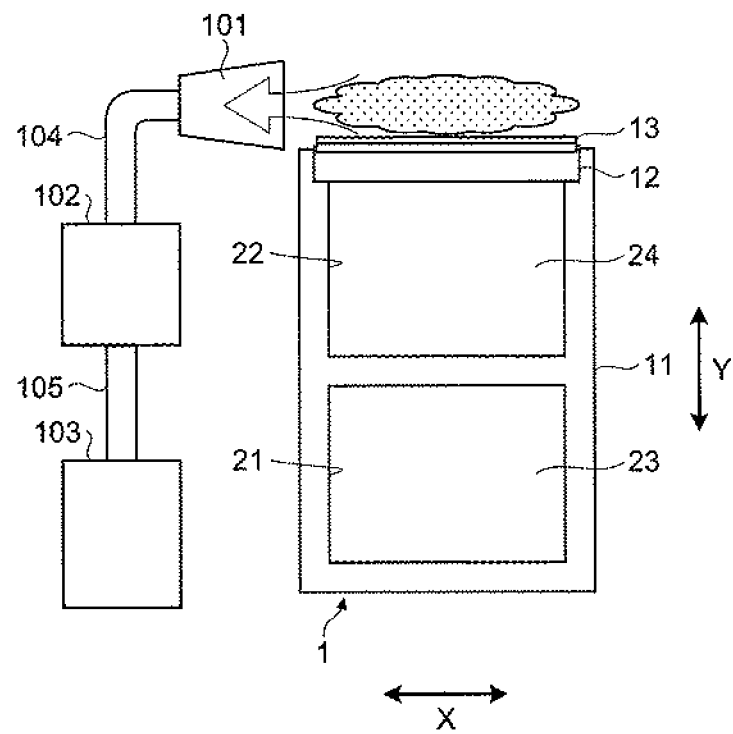
FIG. 7 is a top view for describing a powder suction operation of the three-dimensional shaping apparatus according to the first embodiment.
Figure 8:
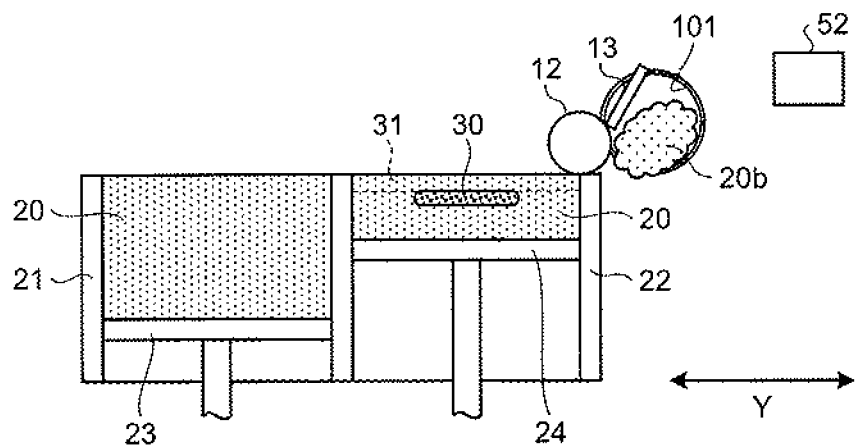
FIG. 8 is a side view for describing the powder suction operation of the three-dimensional shaping apparatus according to the first embodiment.

The suction pump 102 starts suction when, for example, the recoating operation on respective layers is completed or, put another way, when the recoater roller 12 reaches the stop position and stops rotating. As a result, as illustrated in FIG. 7 and FIG. 8, the powder 20 suspended in air to form the cloud 20b in the traveling direction of the recoater roller 12 from the stop position of the recoater roller 12 is sucked through the suction inlet 101. The sucked powder 20 is drawn via the pipe 104 into the suction pump 102, where the powder 20 is separated from gas, and thereafter delivered via the pipe 105 to the powder tank 103 to be held therein. Alternatively, a configuration, in which the powder 20 sucked through the suction inlet 101 is delivered together with gas via the suction pump 102 to the powder tank 103, where the powder 20 is separated from the gas and held in the powder tank 103, may be employed.

When the amount of the powder 20 suspended in air has decreased sufficiently, the suction operation using the suction pump 102 is stopped, and the printing operation using the heads 52 is started.

By sucking the powder 20 suspended in air from the position opposite to the standby position of the carriage 51 in this manner, clinging of the suspended powder 20 to the carriage 51 and the heads 52 can be prevented. As a result, occurrence of a problem, such as defective ejection and clogging, can be reduced, which leads to stable shaped object manufacturing.

The amount of dispersion of the powder 20 varies depending on the type, particle size, and the like of the powder 20. The amount of dispersion of the powder 20 also largely depends on used time. Furthermore, the amount of dispersion of the powder 20 can be affected by an environmental condition, such as the temperature and humidity.

Therefore, the first embodiment is configured such that a suction amount through the suction inlet 101 is adjustable depending on the type and the particle size of the powder 20 to be used and the environmental condition, such as the temperature and humidity.

Figure 9:
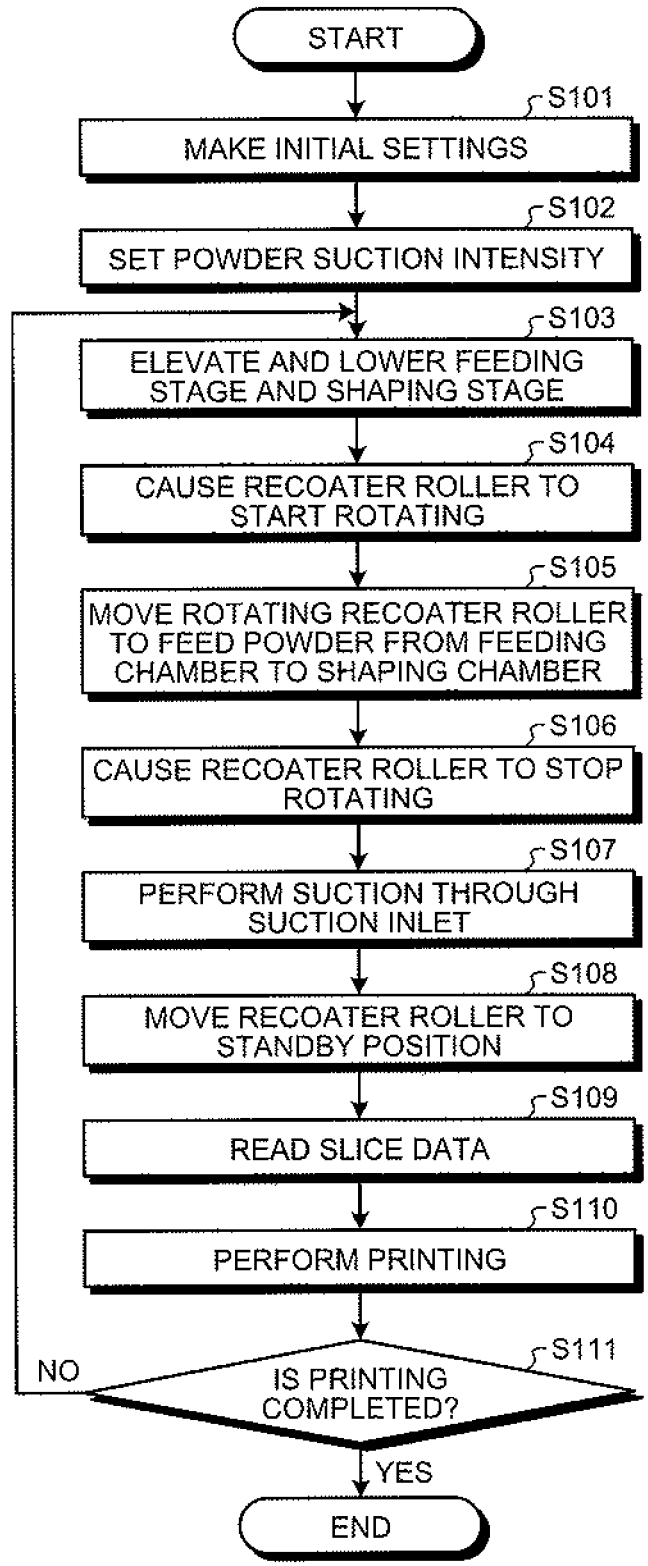
FIG. 9 is a flowchart illustrating an overview of an example of operation in shaping by the three-dimensional shaping apparatus according to the first embodiment.

An overview of an example of operation in shaping by the three-dimensional shaping apparatus 10 according to the first embodiment is described in detail below with reference to FIG. 9. FIG. 9 is a flowchart illustrating the overview of the example of the operation in shaping by the three-dimensional shaping apparatus 10 according to the first embodiment. A focus is placed on how the controller 9 operates in FIG. 9.

As illustrated in FIG. 9, the controller 9 makes initial settings for the shaping operation first (S101). The initial settings to be made include the type (e.g., a material and a particle size) of the powder 20 to be used, a print mode (e.g., color/monochrome, resolution, the rotation speed and/or the moving speed of the recoater roller 12), the environmental condition, such as the temperature and humidity. Among the initial settings, the type (e.g., a material and a particle size) of the powder 20 and the print mode may be determined and entered by a user using an input interface (not illustrated). Values of the environmental condition, such as the temperature and humidity, may be acquired by the controller 9 from a temperature sensor and a humidity sensor (not illustrated).

Next, the controller 9 sets a suction intensity, e.g., the suction amount and/or suction time, for suction through the suction inlet 101 necessary to remove the suspended powder 20 based on the type of the powder 20, the print mode, and the environmental condition of the settings that are made (S102).

Next, the controller 9 causes the feeding stage 23 to be elevated a predetermined distance and causes the shaping stage 24 to be lowered a predetermined distance (S103). Thereafter, the controller 9 causes the recoater roller 12 to start rotating (S104), and causes the rotating recoater roller 12 to move from the standby position to the predetermined stop position (S105). As a result, the powder 20 is fed from the feeding chamber 21 to the shaping chamber 22 while being flattened.

Next, the controller 9 causes the recoater roller 12 to stop rotating (S106), and drives the suction pump 102 to perform suction through the suction inlet 101 in accordance with the suction intensity (the suction amount and/or the suction time) set at S102 (S107). Thereafter, the controller 9 causes the recoater roller 12 to move to the standby position on the feeding chamber 21 (S108). The suction through the suction inlet 101 may be continued until the recoater roller 12 moves to the standby position or, alternatively, may be stopped before the recoater roller 12 starts moving to the standby position.

Next, the controller 9 reads out slice data to be printed from a memory (not illustrated) (S109) and drives the shaping unit 5 to perform printing of slice data (S110). Thereafter, the controller 9 determines whether or not the printing for all the slice data is completed (S111) and, if the printing is completed (YES at Sill), the operation ends. If the printing is not completed (NO at Sill), the controller 9 causes processing to return to S103 so that the operations at S103 and the following steps are performed.

As described above, according to the first embodiment, the suction inlet 101 is arranged close to the stop position, at which the recoater roller 12 is to be placed at completion of the recoating operation, so that the powder 20 suspended in air is sucked and removed through the suction inlet 101. Accordingly, occurrence of a problem, such as defective ejection and clogging, can be reduced. As a result, stable shaped object manufacturing can be achieved.

Second Embodiment

In the first embodiment described above, the powder chamber 11 of the shaping section 1 includes two chambers: the feeding chamber 21 and the shaping chamber 22; however, the feeding chamber 21 may be omitted. When omitted, a configuration for supplying the powder 20 from a powder supply device to the shaping chamber 22 and flattening the fed powder 20 with leveling means may preferably be employed. Such a configuration, from which the feeding chamber 21 is omitted, is described in detail below as a second embodiment with reference to the drawings.

Figure 10:
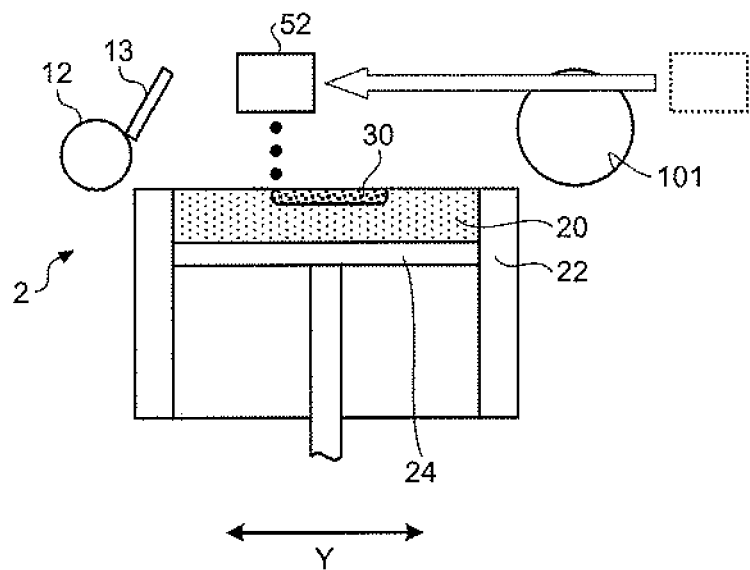
FIG. 10 is a side view of a portion of a three-dimensional shaping apparatus according to a second embodiment, the view being a diagram for describing a printing operation.

FIG. 10 is a side view schematically illustrating an example configuration of a three-dimensional shaping apparatus according to the second embodiment. The second embodiment is similar in configuration to the above-described first embodiment except for the configuration illustrated in FIG. 10, and repeated detailed description is omitted.

As illustrated in FIG. 10, a shaping section 2 according to the second embodiment is similar in configuration to the shaping section 1 of the first embodiment except that the feeding chamber 21 is omitted from the shaping section 2. The powder 20 is directly supplied to the shaping chamber 22 by a powder supply device (not illustrated).

In the second embodiment, as illustrated in FIG. 10, in a process similar to the process described above with reference to FIG. 3, printing is performed on the powder layer 31, which is at the top layer in the shaping chamber 22, whereby the shaped layer 30 is formed.

Figure 11:
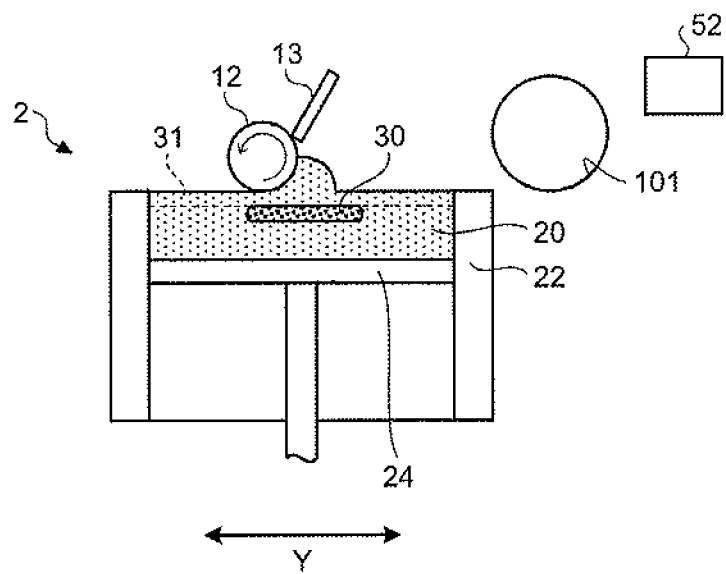
FIG. 11 is a view for describing a recording operation of the three-dimensional shaping apparatus according to the second embodiment.

As illustrated in FIG. 11, the powder 20 is supplied to the shaping chamber 22 as follows. First, shaping stage 24 is lowered to create a space of a predetermined depth above the shaping chamber 22. A predetermined amount of the powder 20 is directly supplied from the powder supply device to this space. The powder 20 may be supplied from the powder supply device to a position near the standby position of the recoater roller 12 or, alternatively, the powder 20 may be supplied using the whole opening of the shaping chamber 22.

Thereafter, the recoater roller 12 is moved from the standby position in the Y direction while rotating the recoater roller 12 to flatten a top surface of the powder 20 protruding above the top opening of the shaping chamber 22, thereby forming the new powder layer 31. At this time, for a case where a surplus amount of the powder 20 falls from the shaping chamber 22, a tray or the like for receiving the falling powder 20 may be arranged.

Thereafter, when the recoater roller 12 has moved to the stop position (the position of the recoater roller 12 at completion of the recoating operation), rotation of the recoater roller 12 is stopped, and suction through the suction inlet 101 is started. Thereafter, after the amount of the powder 20 suspended in air has decreased sufficiently, operations including stopping the suction through the suction inlet 101, moving the recoater roller 12 to the standby position, and the printing is performed at least once to shape a desired 3D shaped object.

The above-described operations can be implemented by, for example, changing the operation at S103 of FIG. 9 to "elevate shaping stage predetermined distance" and the operation at S105 to "move rotating recoater roller to flatten top surface of fed powder". The other operations than the above-described operations may be similar to the operations described with reference to FIG. 9.

As described above, according to the second embodiment, as in the first embodiment, the suction inlet 101 is arranged close to the stop position where the recoater roller 12 is to be placed at completion of the recoating operation, so that the powder 20 suspended in air is sucked and removed through the suction inlet 101. Accordingly, occurrence of a problem, such as defective ejection and clogging, can be reduced. As a result, stable shaped object manufacturing can be achieved.

Third Embodiment

In each of the above-described embodiments, the configuration, in which the powder 20 that is suspended in air to form the cloud 20b in the traveling direction of the recoater roller 12 when the recoater roller 12 is stopped is collected through the suction inlet 101, is illustrated. In a third embodiment, a configuration that can collect, in addition to the powder 20 suspended in air to form the cloud 20b near the stop position of the recoater roller 12, a surplus amount of the powder 20 falling from an edge of the shaping chamber 22 when the top surface of the shaping chamber 22 is flattened with the recoater roller 12 is described through an example.

Figure 12:
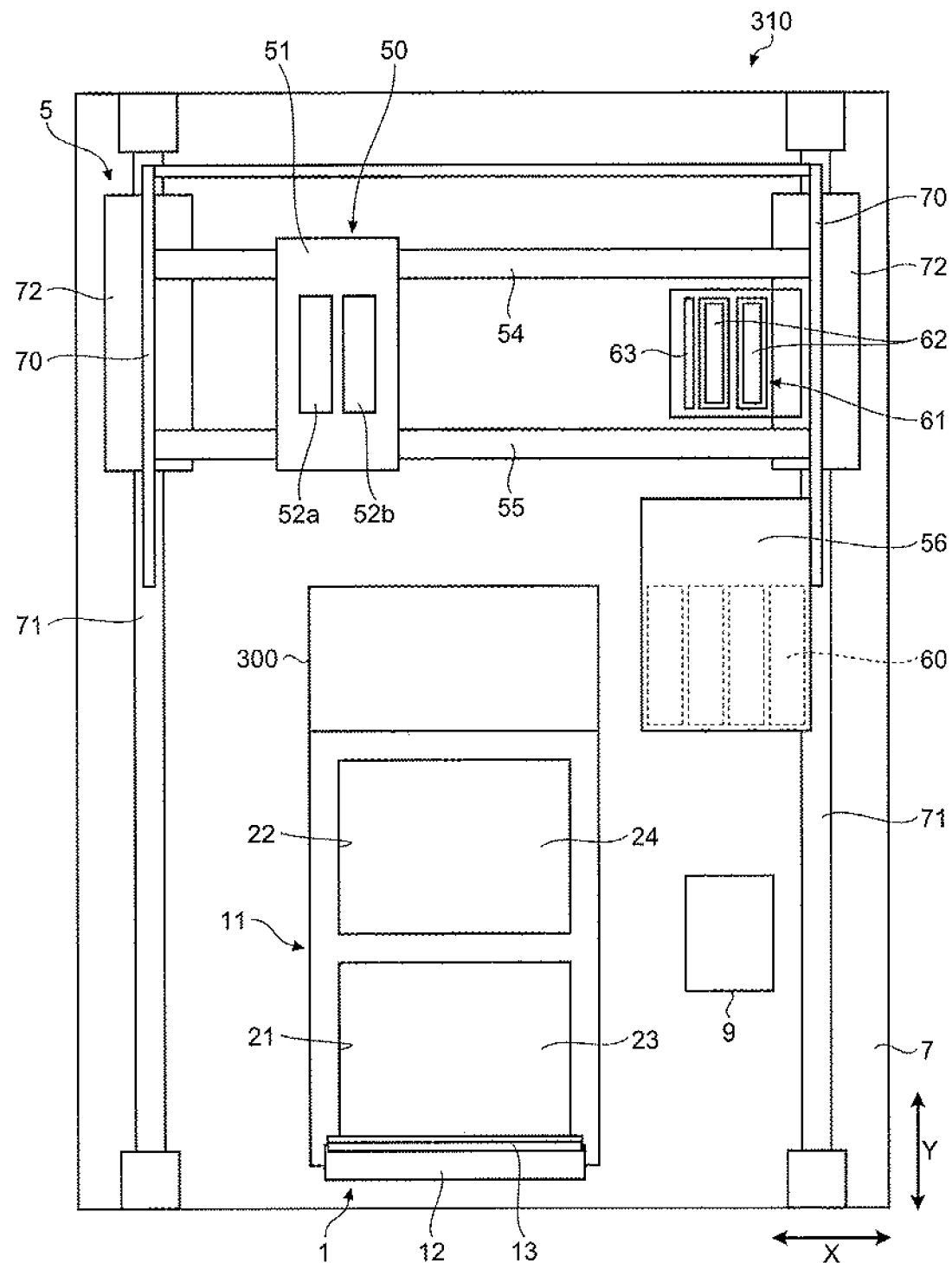
FIG. 12 is a top view schematically illustrating an example configuration of an three-dimensional shaping apparatus according to a third embodiment.
Figure 13:
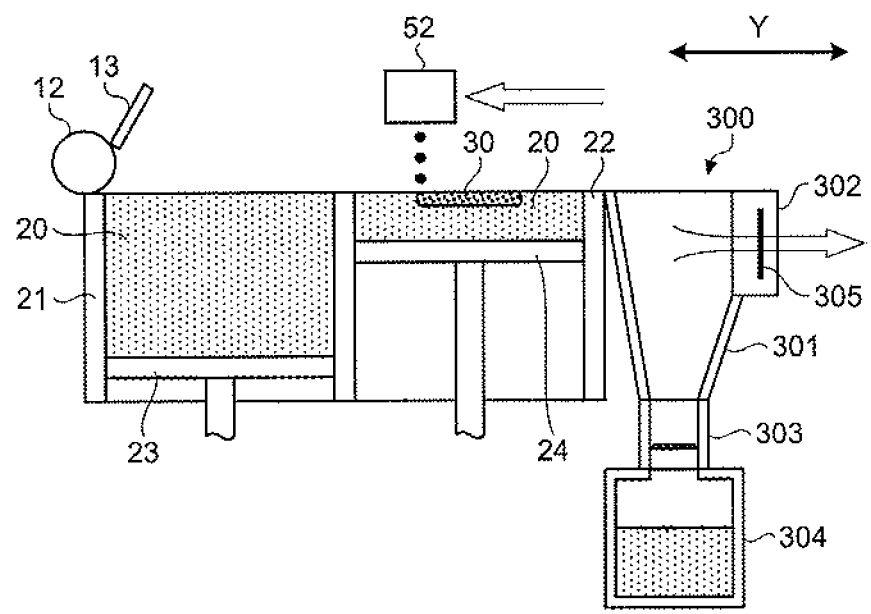
FIG. 13 is a side view schematically illustrating an example configuration of a powder chamber and a collecting unit of the three-dimensional shaping apparatus illustrated in FIG. 12.

FIG. 12 is a top view schematically illustrating an example configuration of a three-dimensional shaping apparatus according to the third embodiment. FIG. 13 is a side view schematically illustrating an example configuration of the powder chamber and a collecting unit of the three-dimensional shaping apparatus illustrated in FIG. 12.

As illustrated in FIG. 12, a three-dimensional shaping apparatus 310 according to the third embodiment is similar in configuration to the three-dimensional shaping apparatus 10 (see FIG. 1) according to the first embodiment except that the suction mechanism 100 (see FIG. 6) including the suction inlet 101 is replaced by a collecting unit 300.

As illustrated in FIG. 13, the collecting unit 300 includes a collecting section 301, a sieving section 303, and a powder tank 304. The collecting unit 300 is arranged, in relation to the shaping chamber 22, close to the stop position where the recoater roller 12 is to be placed at completion of the recoating operation.

The collecting section 301 is a structure having an inverted frustum shape that is open at its top and bottom and have a horizontal cross section tapered from the top to the bottom. The collecting section 301 is arranged at one, which is close to the stop position where the recoater roller 12 is to be placed at completion of the recoating operation, of the four ends of the top face of the shaping chamber 22. The collecting section 301 is preferably arranged in close contact with the shaping chamber 22 with no clearance therebetween. A surplus amount of the powder 20 pushed out of the shaping chamber 22 by the recoater roller 12 enters into the collecting section 301 from the top opening of the collecting section 301 to thus be collected in the collecting unit 300.

The collecting section 301 includes a fan 302 that forms a stream of gas (air) flowing from inside to outside of the collecting section 301. The fan 302 includes a filter 305 for removing the powder 20, dusts, and the like contained in the gas passing through the fan 302.

Figure 14:
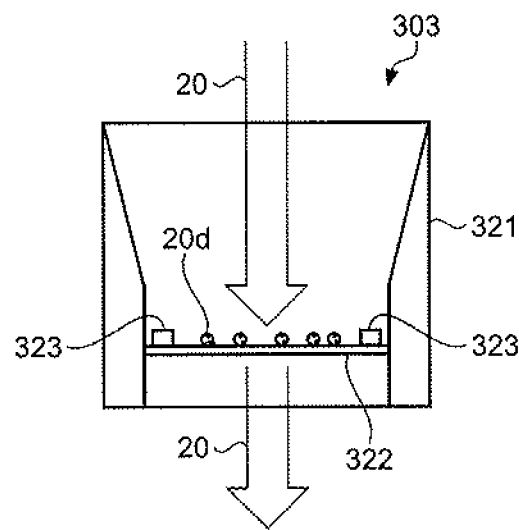
FIG. 14 is a vertical cross-sectional view schematically illustrating an example configuration of a sieving section illustrated in FIG. 13.

The sieving section 303 is connected to the bottom opening of the collecting section 301. FIG. 14 schematically illustrates an example configuration of the sieving section 303. As illustrated in FIG. 14, the sieving section 303 includes a hollow casing 321, a sieve 322 arranged inside the casing 321, and a vibrator 323 that imparts vibrations to the sieve 322. The casing 321 is open at its top and bottom in communication with the bottom opening of the collecting section 301. The top opening of the casing 321 is aligned with the bottom opening of the collecting section 301 so that the powder 20 falling through the collecting section 301 can smoothly enter into the casing 321.

The sieve 322 is arranged in a manner to shield the hollow inside the casing 321. Accordingly, the powder 20 entered into the casing 321 is temporarily blocked by the sieve 322. A sieve suitable for the type of the powder 20 is desirably used as the sieve 322. The number of the sieves 322 is not limited to one, and two or more pieces of the sieve 322 that are stacked on one another may be used.

The vibrator 323 vibrates itself, thereby imparting vibrations to the sieve 322. The vibrations imparted by the vibrator 323 to the sieve 322 and the amplitude thereof may be set as appropriate depending on the type and the particle size of the powder 20 to be used, and a condition, such as the temperature and humidity.

The powder 20 passed through the sieve 322 enters into the powder tank 304 arranged gravitationally below the sieving section 303 and is held in the powder tank 304. The powder 20 held in the powder tank 304 can be returned to the feeding chamber 21 and reused.

With the configuration described above, as illustrated in FIG. 15, when the recoater roller 12 is moved from above the feeding chamber 21 to the stop position (the position of the recoater roller 12 at completion of the recoating operation) on the shaping chamber 22 and stops rotating, the cloud 20b of the powder 20 is suspended in air in the traveling direction of the recoater roller 12 from the stop position and, simultaneously, surplus powder 20c falls from the edge, which is at the stop position of the recoater roller 12, of the shaping chamber 22.

The suspended powder 20 is entrained in the air stream generated by the fan 302 to enter into the collecting section 301 and, thereafter, trapped by the filter 305 arranged in the fan 302. As a result, gas (air), from which the suspended powder 20 is removed, is discharged from the fan 302. The collecting unit 300 may be configured such that the powder 20 trapped by the filter 305 falls into the collecting section 301.

The powder 20c pushed out by the recoater roller 12 and falling from the shaping chamber 22 enters into the collecting section 301 and reaches the sieving section 303 through free fall. In the sieving section 303, the vibrator 323 has started vibrating in response to an externally-fed control signal or detection of entry of the powder 20 by a sensor (not illustrated). Vibrations imparted to the sieve 322 cause a not-aggregated portion of the powder 20 blocked by the sieve 322 to pass through the sieve 322 and fall gravitationally downward to be collected in the powder tank 304. On the other hand, of the powder 20 blocked by the sieve 322, an unwanted portion 20d including powder aggregated into a large diameter, contaminants, and dusts remain blocked by the sieve 322. Thus, the sieving section 303 performs classification into the not-aggregated portion of the powder 20 and the unwanted portion 20d according to a particle size.

Figure 15:
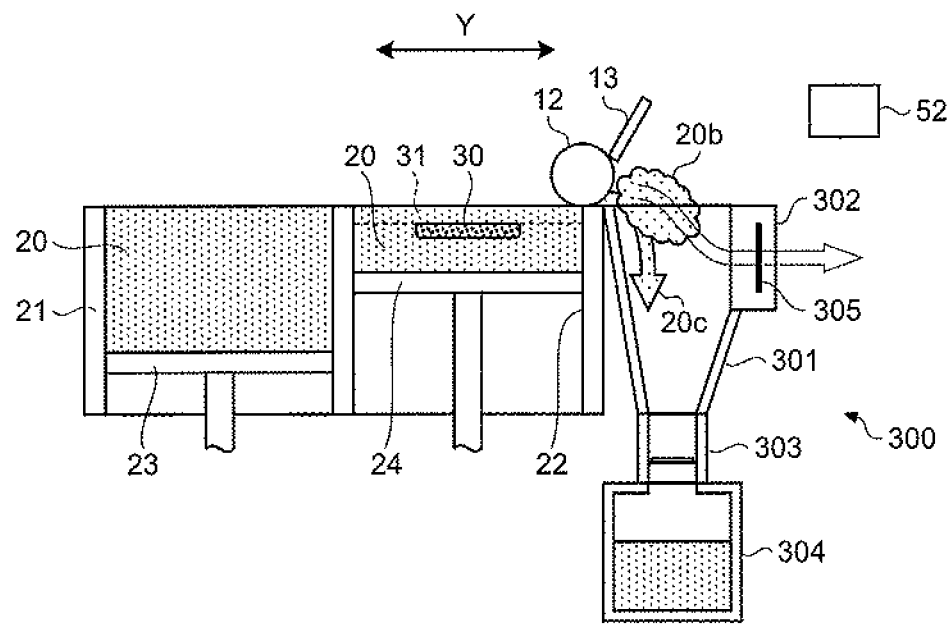
FIG. 15 is a diagram for describing powder that is suspended in air and powder that falls during the recoating operation.
Figure 16:
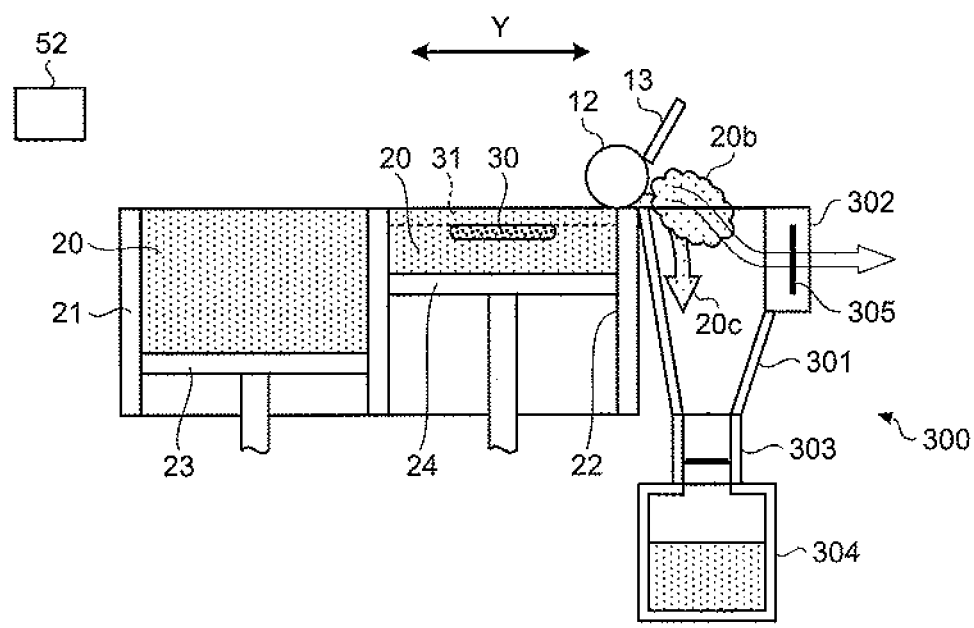
FIG. 16 is a side view schematically illustrating another layout of the powder chamber and the collecting unit of the three-dimensional shaping apparatus.

Although FIG. 15 illustrates a configuration, in which the heads 52 retreat in a direction toward the opposite side of the shaping chamber 22 to the feeding chamber 21 during the recoating operation, the configuration may be modified such that, as illustrated in FIG. 16, the heads 52 retreat in a direction toward the opposite side of the feeding chamber 21 to the shaping chamber 22 during the recoating operation. For example, in the layout illustrated in FIG. 12, places of the feeding chamber 21 and the shaping chamber 22 may be interchanged. In this case, the collecting unit 300 is arranged close to the opposite side of the shaping chamber 22 to the feeding chamber 21. As described above, the collecting unit 300 according to the third embodiment can preferably be arranged at an edge, from which the powder 20 can fall at completion of the recoating operation, irrespective of the relative positions of the feeding chamber 21 and the shaping chamber 22.

An overview of an example of operation in shaping by the three-dimensional shaping apparatus 310 according to the third embodiment is described in detail below with reference to FIG. 17. FIG. 17 is a flowchart illustrating the overview of the example of the operation in shaping by the three-dimensional shaping apparatus 310 according to the third embodiment. In FIG. 17, a focus is placed on how the controller 9 operates; same numerals are used to denote operations similar to operations described above with reference to FIG. 9, and repeated description is omitted.

As illustrated in FIG. 17, the controller 9 makes initial settings for the shaping operation first as at S101 of FIG. 9. Thereafter, the controller 9 sets an amount of rotation (e.g., a suction amount and/or suction time) of the fan 302 and an amount of vibrations (e.g., the amplitude and frequency) of the vibrator 323 based on the type and the particle size of the powder 20 to be used and the environmental condition, such as the temperature and humidity (S201).

Next, as at S103 to S106 of FIG. 9, the controller 9 causes the feeding stage 23 to be elevated and the shaping stage 24 to be lowered (S103), the recoater roller 12 to start rotating (S104), and the recoater roller 12 to move (S105). When the recoater roller 12 has moved to the predetermined stop position, the controller 9 causes the recoater roller 12 to stop rotating (S106).

Next, the controller 9 actuates the fan 302 and the vibrator 323 in accordance with the amount of rotation and the amount of vibrations set at S201 (S202), thereby starting suction of the suspended powder 20 and the classification of the powder 20 collected in the collecting section 301.

Thereafter, as at S108 to S111 of FIG. 9, the controller 9 causes the recoater roller 12 to move to the standby position (S108), reads out slice data to be printed (S109), and performs slice-data printing (S110). Thereafter, the controller 9 determines whether or not the printing for all the slice data is completed (S111). Driving the fan 302 and the vibrator 323 may be continued until the recoater roller 12 moves to the standby position or, alternatively, may be stopped before the recoater roller 12 starts moving to the standby position.

Thereafter, if the controller 9 determines that the printing for all the slice data is completed (YES at S111), the operation ends. If the printing is not completed (NO at S111), the controller 9 causes processing to return to S103 so that the operations at S103 and the following steps are performed.

As described above, in the third embodiment, the collecting unit 300 for collecting surplus powder of the shaping chamber 22 includes the suction mechanism (the fan 302) for collecting the suspended powder 20 and the sieving section 303 for sifting a reusable portion of the powder 20 from the surplus amount of the powder 20. By virtue of this configuration, because the powder 20 suspended in air during the recoating operation is collected by the fan 302, as in the first embodiment, contamination of the carriage 51, the heads 52, and the like inside the three-dimensional shaping apparatus 310 with the powder 20 can be reduced. Furthermore, because the surplus amount of the powder 20 including the powder 20c falling from the shaping chamber 22 and the powder 20 collected by the fan 302 is sifted to perform automatic classification into a the not-aggregated portion of the powder 20 and the other, the unwanted portion 20d, the reusable portion of the powder 20 can be taken out from the surplus amount of the powder 20 easily.

In the above-described configuration, the number of the fans 302 is not limited to one, and may be two or more. The powder tank 304 connected to the sieving section 303 may include a powder conveyance mechanism for automatically returning the size-separated powder 20 to a tank of the powder supply device that supplies the powder 20 to the feeding chamber 21 or the feeding chamber 21.

The third embodiment is similar in configuration, operation, and advantage to the first and second embodiments except for the above, and repeated detailed description is omitted.

According to an embodiment, defective ejection and contamination inside an apparatus resulting from dispersion of powder can be reduced.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A three-dimensional shaping apparatus comprising:
a shaping chamber configured to hold powder;
a leveler configured to move from a first position to a second position in a first direction on a top surface of the powder held in the shaping chamber to flatten the top surface of the powder;
an ejector configured to eject a shaping liquid to the flattened top surface of the powder held in the shaping chamber;
a suction mechanism comprising a suction inlet fixed to be located outside the shaping chamber at a position beyond the second position in the first direction; and
a controller configured to control the leveler, the ejector, and the suction mechanism,
wherein
the leveler comprises a cylindrical recoater roller configured to move from the first position to the second position in the first direction on the top surface of the powder, and
the controller is configured to control
the recoater roller to rotate during moving of the recoater roller from the first position to the second position in the first direction,
the recoater roller to stop rotating in response to stopping the recoater roller at the second position, and
the suction mechanism so as to start suction through the suction inlet after the recoater roller has stopped at the second position and stopped rotating.

2. The three-dimensional shaping apparatus according to claim 1, wherein
if the ejector does not eject the shaping liquid to the top surface, the ejector is configured to be at a third position that is closer to the second position than to the first position and closer to one side of the shaping chamber than to an opposite side of the shaping chamber, and
the suction inlet is arranged at a fourth position that is closer to the second position than to the first position and closer to the opposite side of the shaping chamber than to the one side.

3. The three-dimensional shaping apparatus according to claim 1, wherein the controller is configured to set an amount of suction through the suction inlet by the suction mechanism based on at least any one of a material of the powder, a particle size of the powder, a print mode of a printing operation performed by the ejector, and a temperature and humidity.

4. The three-dimensional shaping apparatus according to claim 1, wherein the suction mechanism comprises a powder tank configured to hold the powder sucked together with gas through the suction inlet.

5. The three-dimensional shaping apparatus according to claim 1, further comprising a feeding chamber arranged adjacent to the shaping chamber and configured to hold the powder to be fed to the shaping chamber, wherein
the first position is close to an opposite side of the feeding chamber.

6. The three-dimensional shaping apparatus according to claim 1, further comprising a collecting unit configured to collect the powder falling from an edge, close to the second position, of the shaping chamber, wherein
the collecting unit comprises:
a collecting section configured to collect the powder falling from the edge, close to the second position, of the shaping chamber;

a sieving section configured to classify the powder collected in the collecting section according to a particle size; and a powder tank configured to hold the powder with a small particle size in the classified powder.

7. The three-dimensional shaping apparatus according to claim 6, wherein the sieving section comprises:

a sieve configured to classify the powder collected in the collecting section; and a vibrator configured to impart vibrations to the sieve.

8. The three-dimensional shaping apparatus according to claim 7, wherein the controller is configured to control the leveler so as to move from the first position to the second position in the first direction on the top surface of the powder held in the shaping chamber, and the vibrator so as to start classification of the powder collected in the collecting section after the leveler has stopped at the second position.

9. The three-dimensional shaping apparatus according to claim 8, wherein the controller is configured to control an amount of vibrations of the vibrator based on at least any one of a material of the powder, a particle size of the powder, and an ambient temperature and humidity.

10. The three-dimensional shaping apparatus according to claim 6, wherein the suction mechanism is arranged in the collecting section so as to generate a stream of gas flowing from inside to outside of the collecting section.

11. The three-dimensional shaping apparatus according to claim 10, wherein the suction mechanism includes a filter configured to trap powder contained in sucked gas.

12. The three-dimensional shaping apparatus according to claim 1, wherein the suction mechanism provides suction in a transverse direction, the transverse direction being perpendicular to the first direction and being perpendicular to an ejection direction of the shaping liquid.

13. The three-dimensional shaping apparatus according to claim 1, wherein the suction inlet opens in a transverse direction, the transverse direction being perpendicular to the first direction and being perpendicular to an ejection direction of the shaping liquid.

14. A three-dimensional shaping system comprising:

a shaping chamber configured to hold powder;

a leveler configured to move from a first position to a second position in a first direction on a top surface of the powder held in the shaping chamber to flatten the top surface of the powder;

an ejector configured to eject a shaping liquid to the flattened top surface of the powder held in the shaping chamber;

a collecting unit configured to collect the powder falling from an edge, close to the second position, of the shaping chamber, the collecting unit comprising:

a collecting section configured to collect the powder falling from the edge, close to the second position, of the shaping chamber;

a sieving section configured to classify the powder collected in the collecting section according to a particle size; and a powder tank configured to hold the powder with a small particle size in the classified powder, wherein the sieving section comprises:

a sieve configured to classify the powder collected in the collecting section; and a vibrator configured to impart vibrations to the sieve; and a controller configured to control the leveler, the ejector, and the vibrator, wherein the controller is configured to control the leveler so as to move from the first position to the second position in the first direction on the top surface of the powder held in the shaping chamber, and the vibrator so as to start classification of the powder collected in the collecting section after the leveler has stopped at the second position.

15. The three-dimensional shaping apparatus according to claim 14, wherein the controller is configured to control an amount of vibrations of the vibrator based on at least any one of a material of the powder, a particle size of the powder, and an ambient temperature and humidity.

\* \* \* \* \*